United States Patent [19]

Dalke et al.

[11] Patent Number: 5,254,835
[45] Date of Patent: Oct. 19, 1993

[54] ROBOTIC WELDER FOR NUCLEAR BOILING WATER REACTORS

[75] Inventors: Charles A. Dalke; Gene W. Comstock; John A. Sies, all of San Jose; Jan N. Hodges, Campbell, all of Calif.

[73] Assignee: General Electric Company, San Jose, Calif.

[21] Appl. No.: 730,498

[22] Filed: Jul. 16, 1991

[51] Int. Cl.$^5$ .................................................. B23K 9/12
[52] U.S. Cl. ................................. 219/125.11; 219/138; 901/42
[58] Field of Search ............... 219/60 R, 7 S, 125.11, 219/138, 60.2, 61; 376/294; 901/42; 228/29

[56] References Cited

U.S. PATENT DOCUMENTS 3,061,714 10/1962 Van Sciver II., et al. ............ 219/75
3,841,547 10/1974 Bartley ................................. 219/60.2

FOREIGN PATENT DOCUMENTS 56-56787 5/1981 Japan ..................................... 219/138

Primary Examiner—Clifford C. Shaw
Attorney, Agent, or Firm—J.S. Beulick

[57] ABSTRACT

One aspect of the present invention comprises an apparatus for storing an end effector nestably adjacent a pipe to which it is attached and for moving the end effector into a working position laterally-displaced from said pipe is disclosed. Such apparatus desirably is part of the robotic welding apparatus wherein the end effector is a welding head. This apparatus comprises a pair of pipe segments in rotating end-abuttable relationship, each segment bearing a ring gear about its circumference; a pair of helical lotus petals having an in inner surface which conforms to the outer surface of the pipe segment to which each lotus petal is hingedly attached at its distal end, each lotus petal being attached hingedly at their respective distal ends to a lotus petal hinge attachment stage; drive means drivably connected to each of said ring gears for separately driving each pipe segment; and an end effector carried by said lotus petal hinge attachment stage. Each lotus petal and said lotus petal hinge attachment stage, and thus said end effector, are nestably stored adjacent their respective pipe segments. The end effector is movable to a working position laterally-displaced from said pipe by said drive means driving said pipe segments in opposite directions. The end effector is movable horizontally (Y axis motion) by driving said pipe segments differentially in the same direction.

20 Claims, 15 Drawing Sheets

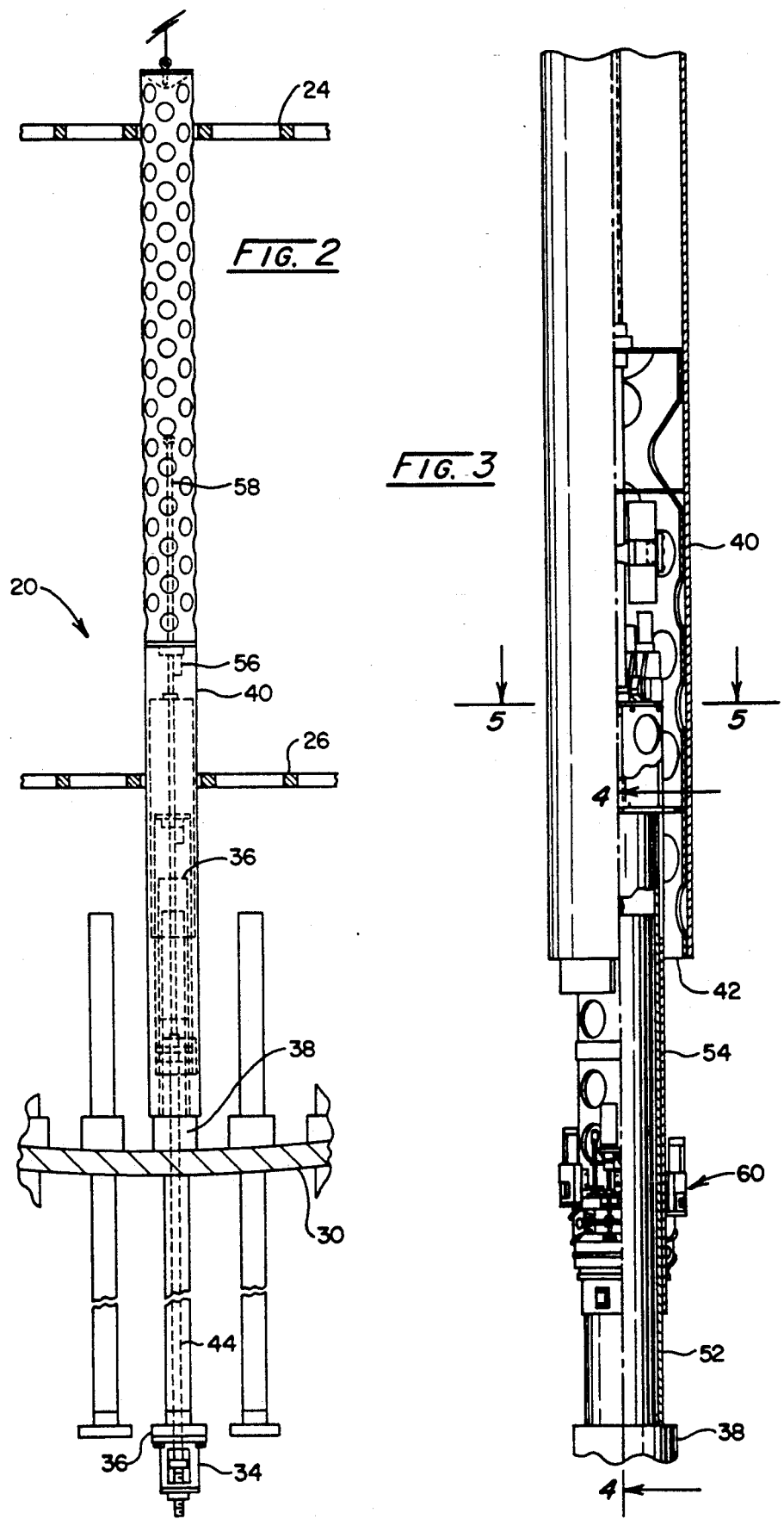

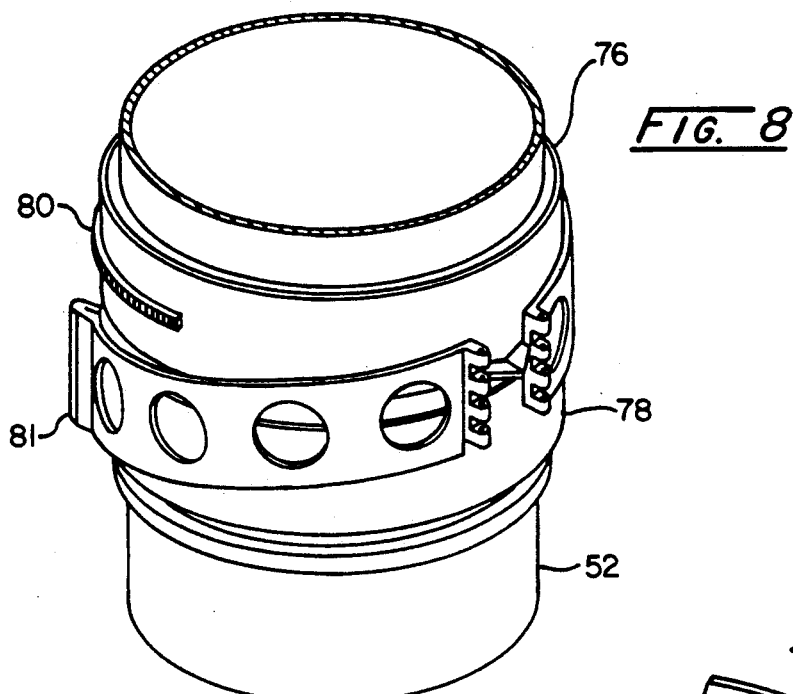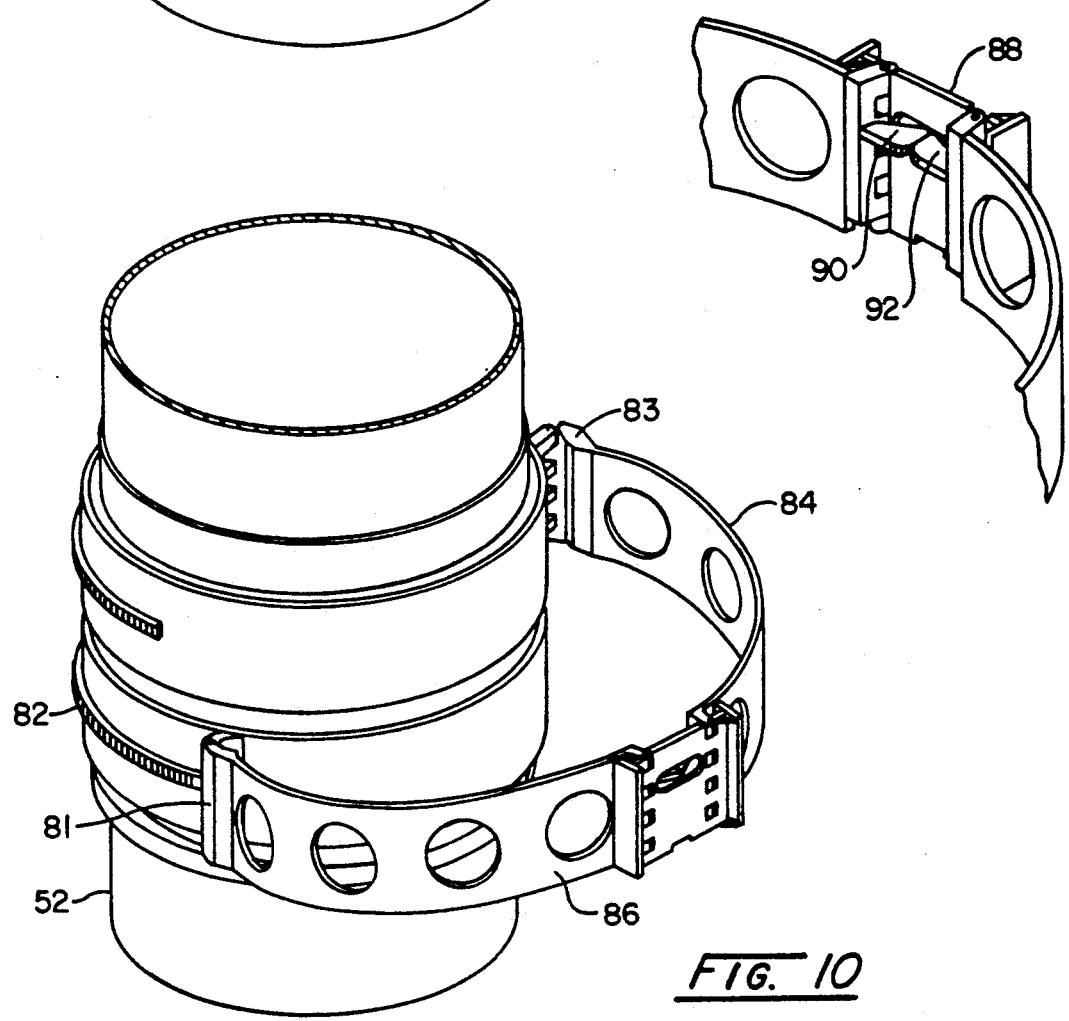

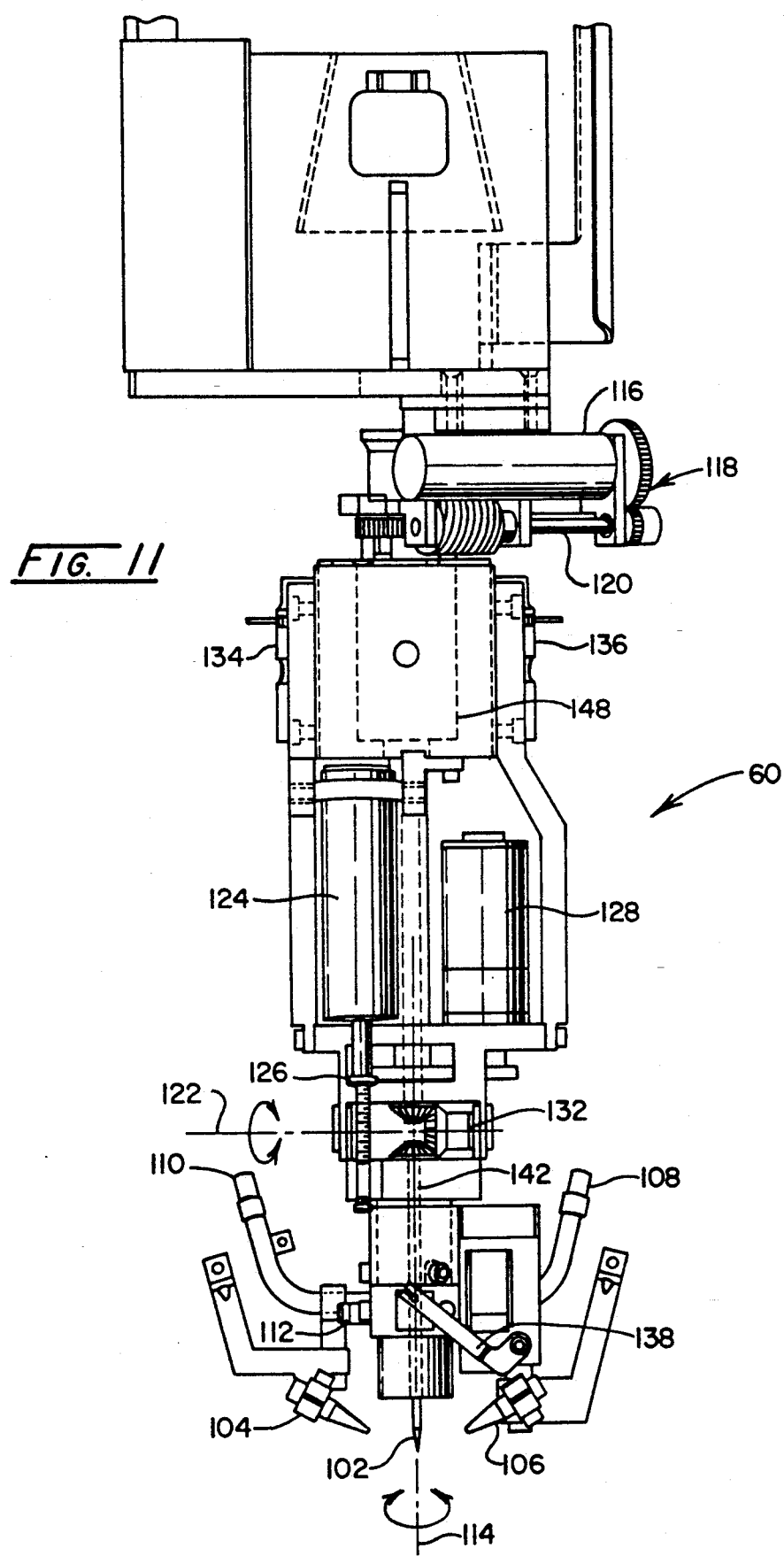

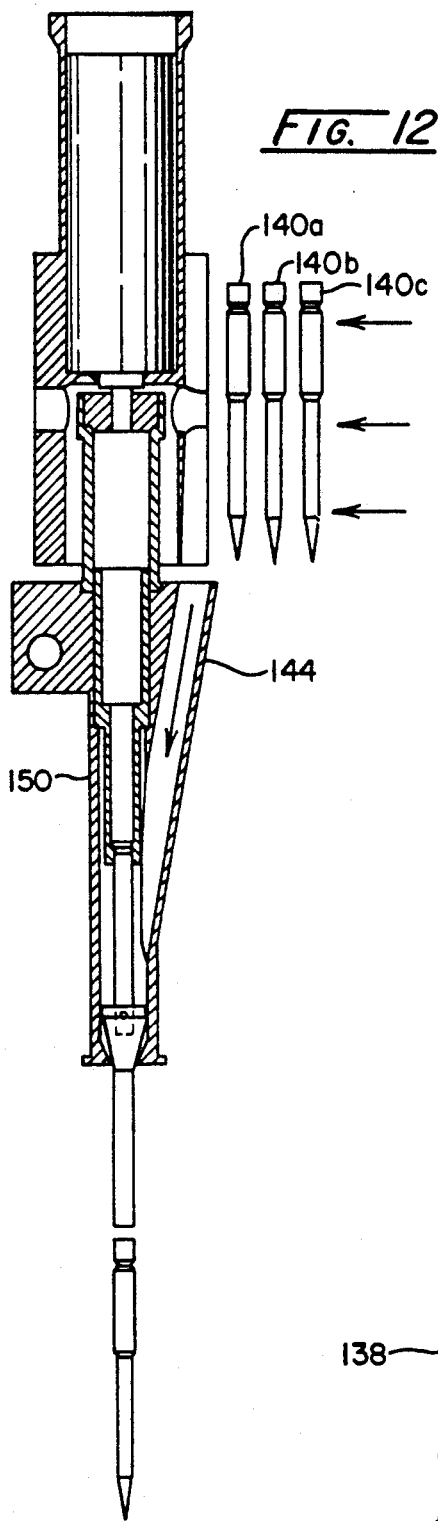
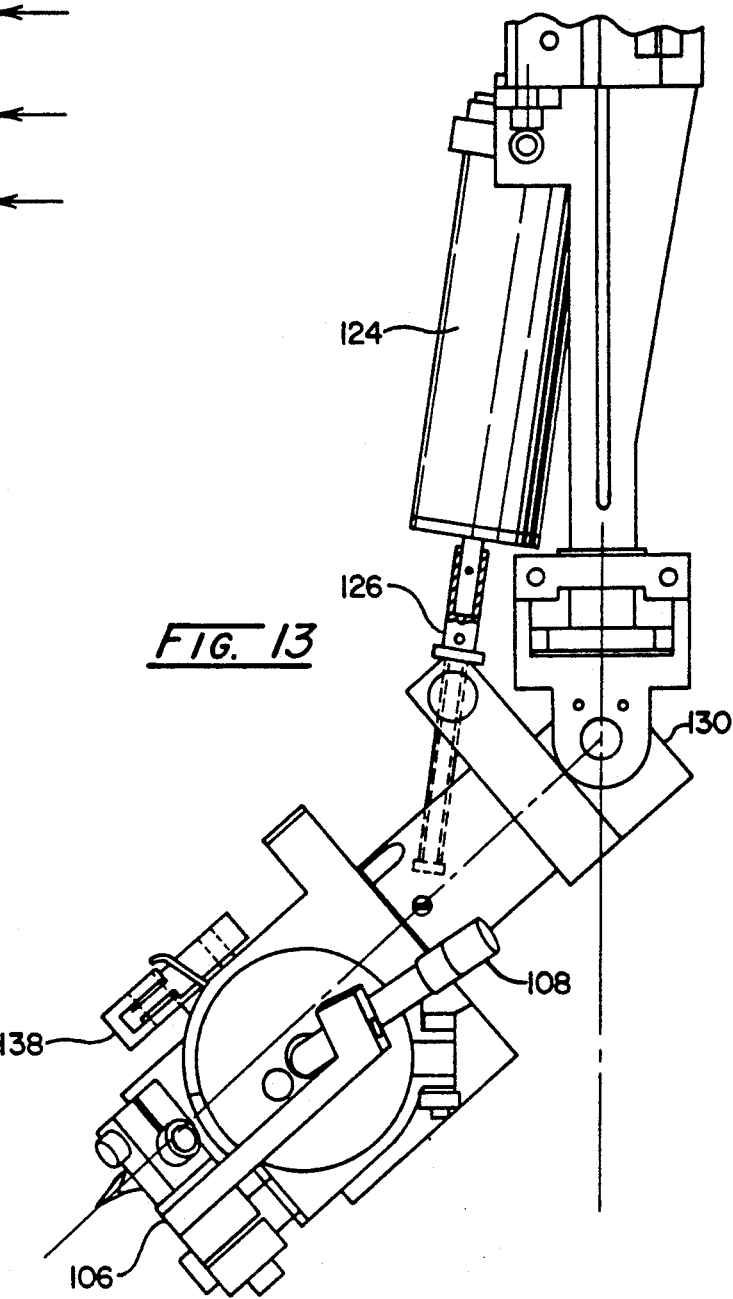

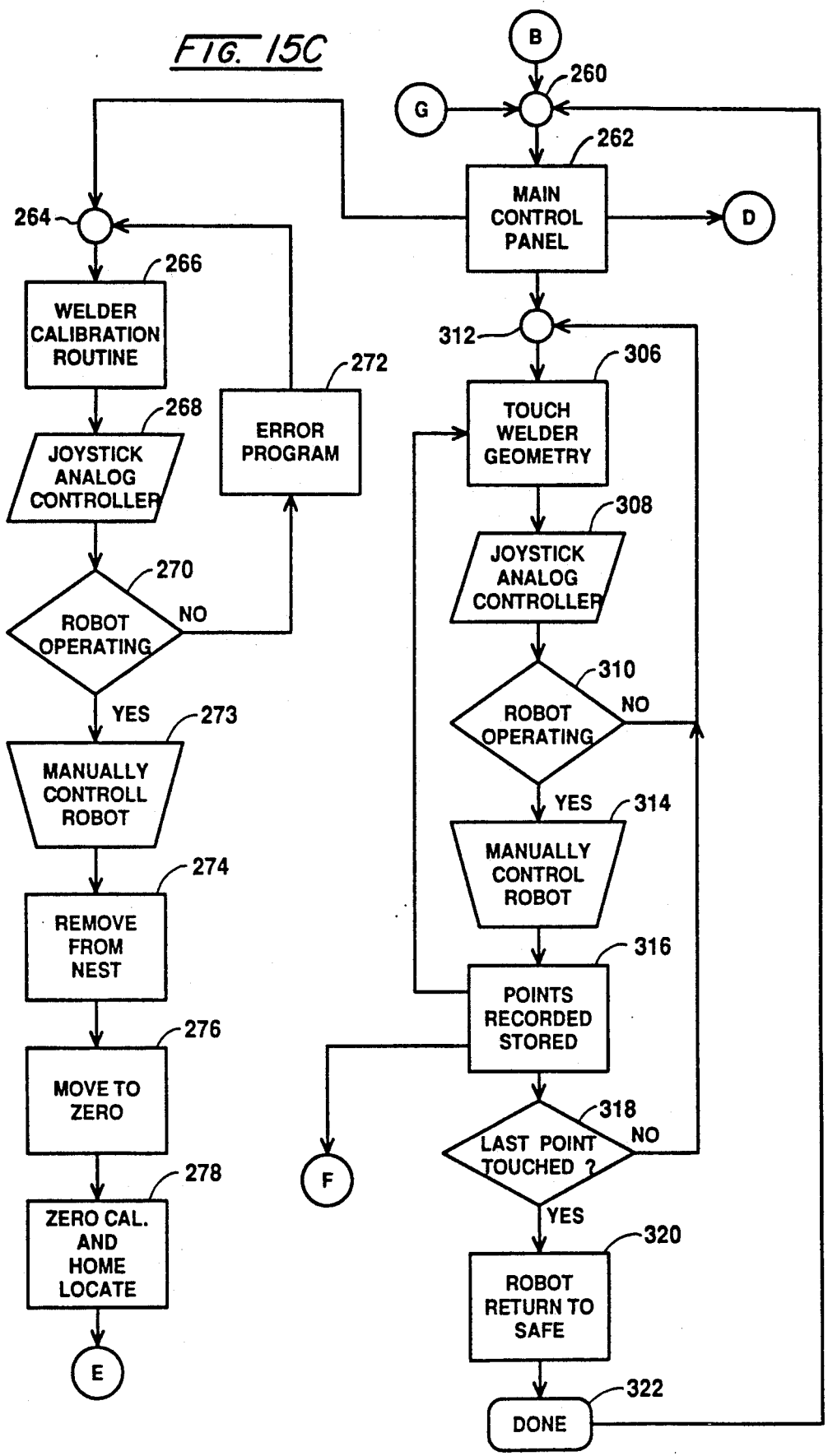

ROBOTIC WELDER FOR NUCLEAR BOILING WATER REACTORS

BACKGROUND OF THE INVENTION

The present invention relates to welding within the confines of a nuclear reactor pressure vessel (RPV) bottom head and more particularly to a robotic welder specifically designed for such welding purposes.

Cracking in the heat affected zone of stainless steel and Ni—Cr—Fe welds within a boiling water reactor (BWR) environment is a well-known problem. Repair of such cracks is performed by removing the cracked material and rewelding the components using improved materials and processes. When the cracked material is located in an inaccessible area, such as the RPV inside bottom head, special methods must be employed to affect the repair.

The stub tube is a weldment located on the inside surface of the RPV bottom head between adjacent control rod drive housings. The drive housings severely restrict access to the repair area. The core plate and top guide further restrict access. Because the BWR bottom head is hemispherical in shape, the stub tube centers will vary from near horizontal to a maximum in core housing penetration angle of about 46°, which geometry additionally complicates the repair process.

BROAD STATEMENT OF THE INVENTION

One aspect of the present invention is a robotic welding apparatus adapted to be placed inside the bottom head of a nuclear RPV for effecting weld build-ups and repairs. Such apparatus comprises an upper guide can stationarily-attached to a first tube of a pair of annular telescoping lower tubes. An annular movable water seal can which houses said pair of telescoping lower tubes is movable from a position where, when filled with gas, it encases said telescoping lower tubes and keeps water out so that said apparatus can be lowered in a water-filled RPV to its bottom head, to a position where it is retracted upwardly to expose the telescoping lower tubes when the RPV is drained of water. A water seal can driver is provided for moving the water seal can. An elongate clamp tool which firmly retains the second of said pair of lower tubes against the RPV head also is provided. A driver is provided for extending the first telescoping tube away from the second telescoping tube and a welding head is attached to the first telescoping tube in a nested position against said first telescoping tube when said water seal can encases said telescoping lower tubes and is movable laterally away from the first telescoping tube when the water seal can is in its retracted position.

As another aspect of the present invention, an apparatus for storing an end effector nestably adjacent a pipe to which it is attached and for moving the end effector into a working position laterally-displaced from said pipe is disclosed. Such apparatus desirably is part of the robotic welding apparatus wherein the end effector is a welding head. This apparatus comprises a pair of pipe segments in rotating end-abuttable relationship, each segment bearing a ring gear about its circumference; a pair of helical lotus petals having an in inner surface which conforms to the outer surface of the pipe segment to which each lotus petal is hingedly attached at its distal end, each lotus petal being hingedly attached at their respective proximal ends to a lotus petal hinge attachment stage and carrying engaged gear segments on each proximal end which stabilize the lotus petals with respect to each other; drive means drivably connected to each of said ring gears for separately driving each pipe segment; and an end effector carried by said lotus petal hinge attachment stage. Each lotus petal and said lotus petal hinge attachment stage, and thus said end effector, are nestably stored adjacent their respective pipe segments. The end effector is moveable to a working position laterally-displaced (X axis) from said pipe by said drive means driving said pipe segments in opposite directions, and moveable horizontally (Y axis) by differentially driving said pipe segments in the same direction.

As another aspect of the present invention, a welding tip loading apparatus for ejecting a spent welding tip and loading a new welding tip for use by the robotic welding apparatus is disclosed. Such welding tip loading apparatus comprises a magazine which retains a plurality of welding tips; a hollow loading chute disposed beneath said magazine and adapted to receive a welding trip from said magazine; a remotely-actuable driver for urging a welding tip from within said magazine into said loading chute; a hollow loading chamber which retains an annular reciprocating telescoping loader/ejector. This chamber is in communication with the loading chute for receiving a welding tip disposed in said chute. The loader/ejector is adapted to move the welding tip through said loading chamber into a position where a portion of said welding tip protrudes out of said loading chamber and is in a welding use position. A movable remotely-actuable connector which communicates to within said loading chamber, said connector in communication with a source of electrical power and being movable from a position where it contacts said welding tip for providing electrical connection to the welding tip in its use position to a position where it no longer contacts said welding tip so that the welding tip can be released from said loading chamber by said loader/ejector to be replaced by another welding tip which is fed by the loader/ejector to a use position.

For present purposes, X axis movement of the end effector (or welding head) means movement of the end effector laterally away from the pipe to which it is attached; Y axis movement of the end effector means movement laterally in the same plane as and perpendicular to X axis movement; and Z axis movement of the end effector means vertical movement of the end effector out of the X-Y plane. Omega motion of the end effector means in and out reciprocating movement of the welding wrist and welding tip.

The corresponding methods for using the foregoing apparati comprise further aspects of the present invention and will be described in detail herein.

BRIEF DESCRIPTION OF THE DRAWINGS

FIG. 2 is a partial sectional view of the robotic welder seated in position at a stub tube of the RPV bottom head;

FIG. 3 is a partial sectional elevational view of the robotic welder with the water seal can being lifted to expose the welding head;

FIG. 8 is an enlarged perspective view of the lotus drive mechanism in its nested position;

FIG. 9 is an exploded partial perspective view of the attachment stage connecting the two petals of the lotus drive mechanism;

FIG. 10 is a perspective elevational view of the lotus drive mechanism in its extended position with the end effector attachment stage removed for clarity;

FIG. 11 is a side elevational view of the end effector which is attached to the lotus drive mechanism attachment stage;

FIG. 12 is a simplified cross-sectional elevational view showing the path that the weld tips take when being loaded from the magazine into the weld head;

FIG. 13 is a side-elevational view of the weld head in its use position;

FIGS. 15A-15G are flow diagrams of the computer program that controls and operates the inventive robotic welder disclosed herein.

The drawings will be described in detail in connection with the following description.

DETAILED DESCRIPTION OF THE INVENTION

Figure 1:
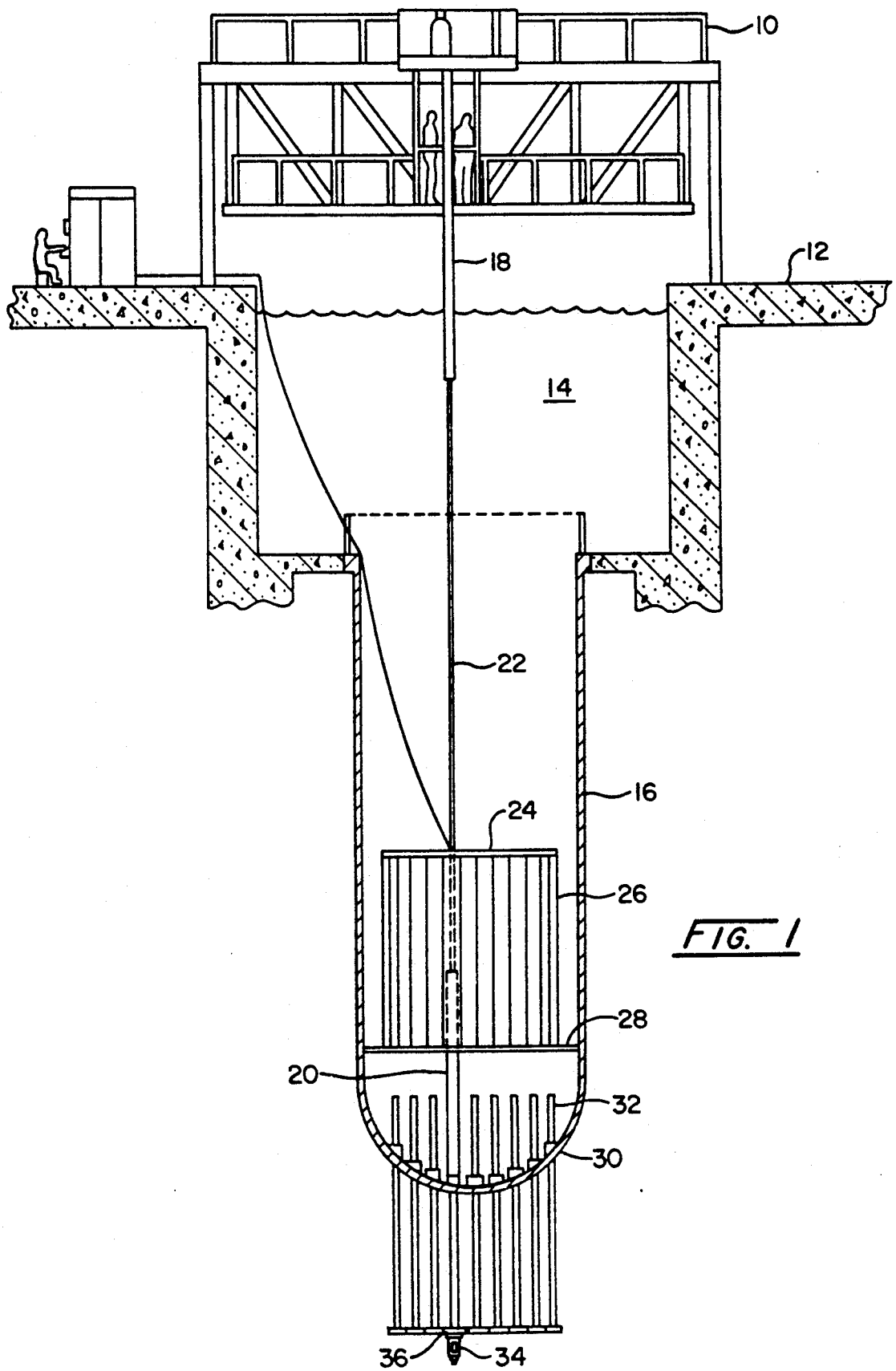
FIG. 1 is a perspective view of a nuclear facility showing refueling and interior service inspection facilities during a planned shut-down wherein the robotic welder of the present invention has been lowered into position at the RPV bottom head.

As can be seen by reference to FIG. 1, refueling bridge 10 is located on refueling floor 12 which surmounts pool 14 above reactor pressure vessel 16. Via refueling manipulator 18, robotic welder 20 of the present invention is lowered via cable 22 through upper core plate 24 and thence through core 26. Robotic welder 20 next penetrates through lower core plate 28 to RPV bottom 30. The area immediately above RPV head bottom 30 lies between adjacent control rod drive housings, e.g. housing 32. These housings extend above the inside surface of head 30 up to 3 feet. The housings typically are 6 inches in diameter increasing to 7¼ inches in diameter at the bottom head stub tube region. Thus, the work area is severely restricted. Furthermore, no direct overhead access exists above incore instrument locations.

It will be observed that when robotic welder 20 is installed in RPV 16, the mounting cylinder (tube 52, FIG. 4) rests on the upper surface of CRD stub tube 38 and housing 36 (FIG. 4) extends inside the robot approximately 3 feet. Robotic welder assembly 20 is maintained in its position by clamp tool apparatus 34 which mounts against CRD housing flange 36.

Further detail on mounting robotic welding assembly 20 is seen by reference to FIG. 2. Inasmuch as robotic welder assembly 20 must fit through upper core plate 24 and lower core plate 26, it is designed to be round and approximately 10.75 inch in diameter. It will be observed that the assembly fits over control rod drive housing 36 and rests atop stub tube 38. Clamp tool 34 insures that robotic welder assembly 20 is maintained firmly seated against stub tube 38. Inasmuch as the housing extends inside the robot assembly approximately 3 feet, the robot mechanism itself is contained in the 2.3 inch annulus created between the CRD housing and water seal can 40 which, as noted above, is sized to pass through a 10.875 inch diameter core plate hole.

Robotic welder assembly 20 is composed of upper guide can 42 which has a plurality of openings for reducing weight. As can be seen better by reference to FIGS. 2 and 4, the assembly is maintained on stub tube 38 via annular rod 44 which is connected via collet 46 to center rod 48 which, in turn, is firmly connected to plate 50. The bosses on center rod 48 permit adjustability of the location of collet 46 and its connection to annular rod 44. By tightening clamp tool 34, tension is exerted from annular rod 44 through center rod 48 to ensure that tube 52 of telescoping tubes 52 and 54 rest firmly atop stub tube 38.

Figure 4:
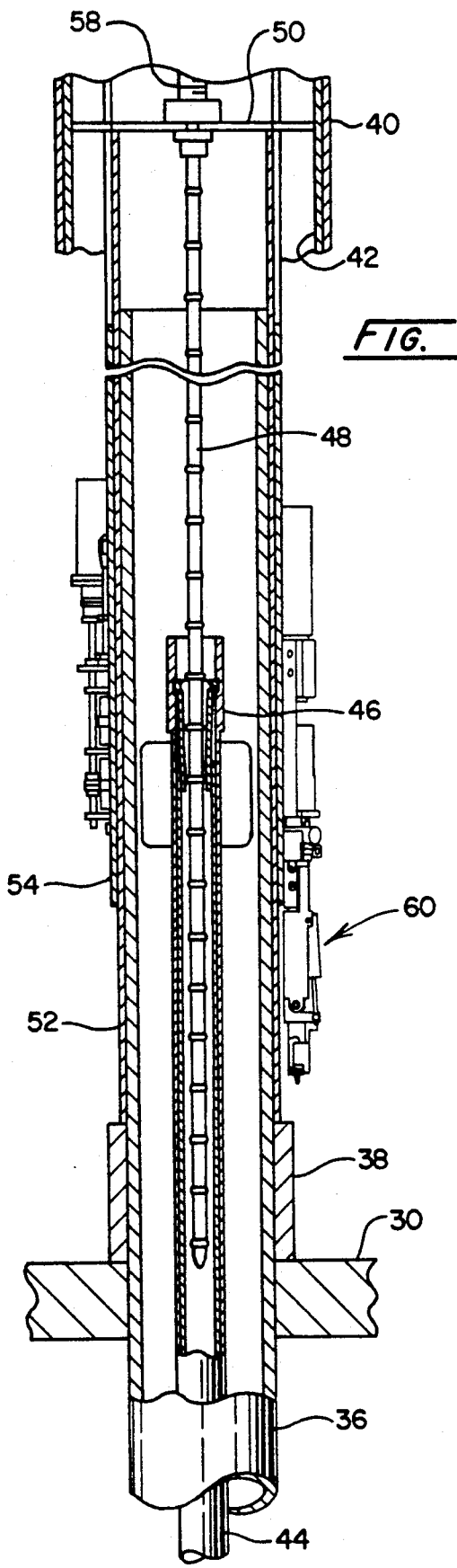
FIG. 4 is a cross-sectional elevational view taken along line 4—4 of FIG. 3.

It will be observed from FIGS. 2 and 3 that motor 56 enables water seal can 40 to be raised from stub tube 38 via threaded rod 58 to its retracted position shown at FIG. 4, thus revealing welding head assembly 60. It also will be observed that welding head assembly 60 fits within the annular space between water seal can 40 and telescoping tubes 52 and 54, which space is 2.3 inches in design.

Figure 5:
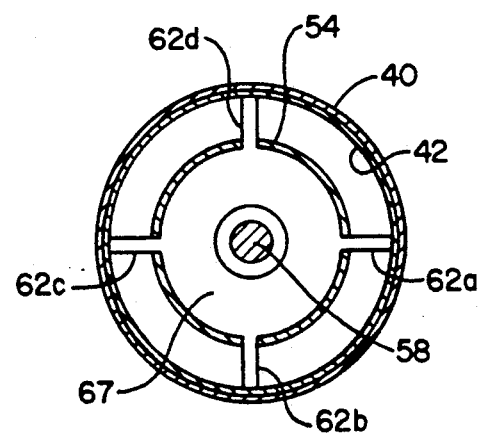
FIG. 5 is a cross-sectional elevational view taken along line 5—5 of FIG. 3.

From FIG. 5, it will be observed that tube 42 is connected to plate 50 via screws provided for through ears 62a-62d. Tube 54 is connected to plate 67 (see FIG. 6 also) and is driven up and down (Z axis motion) by motor 68. Ears 62a-62d extend through slots in guide tube 42 and react motor 68 torque to stationary tube 52. Pipe segments 76 and 78 are attached to tube 54 by ball bearings and are, thus, moved in the Z direction (vertically) by drive motor 68.

Figure 6:
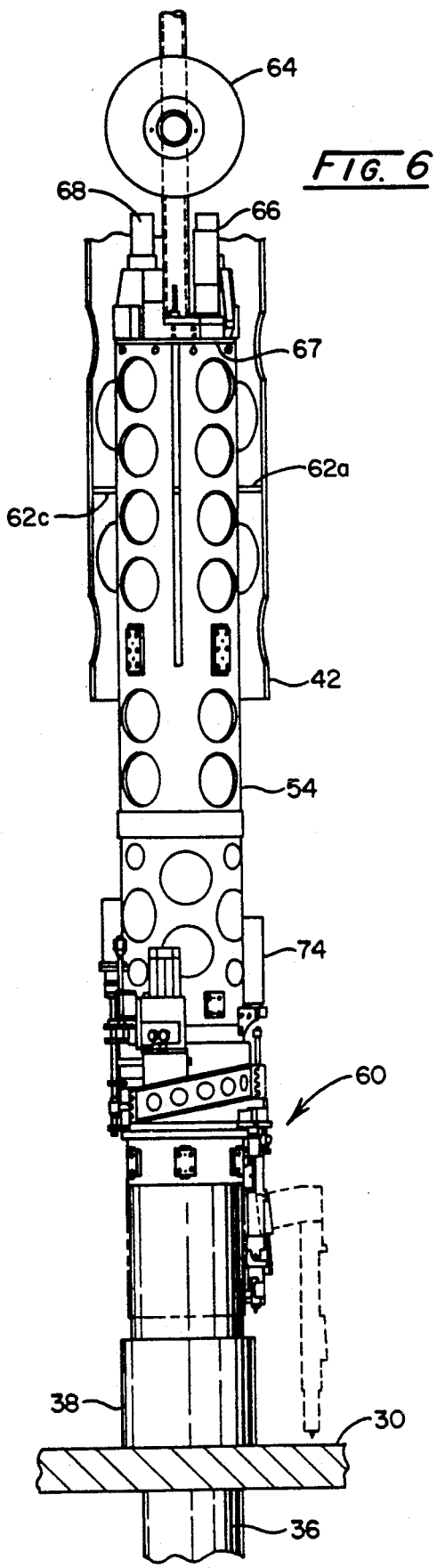
FIG. 6 is a partial sectional elevational view of the robotic welder partially broken away to reveal the weld wire feed mechanism with the welding head shown in dashed lines being extended to its use position.

With reference to FIG. 6, it will be observed that weld wire spool 64 and another spool not shown at FIG. 6 maintain weld wire which is fed to welding head assembly 60 via motors 66 and another not shown in the drawings. The wire then travels down to weld wire feed drivers 70 and 72 (FIG. 7), and thence to weld head assembly 60. With further reference to FIG. 6, camera 74 is seen to be mounted at the stage where weld head apparatus 60 is attached. Fiber optics from camera 74 run to welding head assembly 60 so that the operator can view the welding operation being conducted.

Referring to FIGS. 8-10, it will be observed that pipe segments 76 and 78 are in rotating end-abuttable relationship. Pipe segment 76 bears ring gear 80 about its circumference (about a 200° arc) while pipe segment 78 bears ring gear 82 about its circumference (also about a 200° arc). Ring gear 80 has bosses which carry hinge 83 which provides for hinged connection to helical lotus petal 84 and its distal end. Similarly, ring gear 82 has bosses which carry hinge 81 which provides for hinged connection to helical lotus petal 86 at its distal end. In turn, lotus petals 84 and 86 are hingedly attached at their proximal ends to end effector attachment stage 88. Lotus petals 84 and 86 at their proximal ends also each carry one of a pair of engaged (enmeshed) gear segments 90 and 92. Gear segments 90 and 92 are engaged regardless of the position of the lotus petals in the X-Y plane and stabilize the lotus petals with respect to each other. Attached to end effector attachment stage 88 is welding head assembly 60 (the preferred end effector), to be described later. The inside surfaces of helical lotus petals 84 and 86 conform to the outer surfaces of pipe segments 76 and 78 when the mechanism is in its nested or rest position.

It will be observed that rotation of pipe segment 76 counter to the rotation of pipe segment 78 will cause lotus petals 84 and 86 to extend from their nested position shown at FIG. 8 to a fully extended position as shown at FIG. 10. The lotus petal assembly of the present invention permits welding head assembly 60 to be nested against telescoping tube 52 (see FIG. 4) within a 2.3 inch annular space and thence extended laterally away a distance of approximately 7.1 inches in the radial or X direction.

Figure 7:
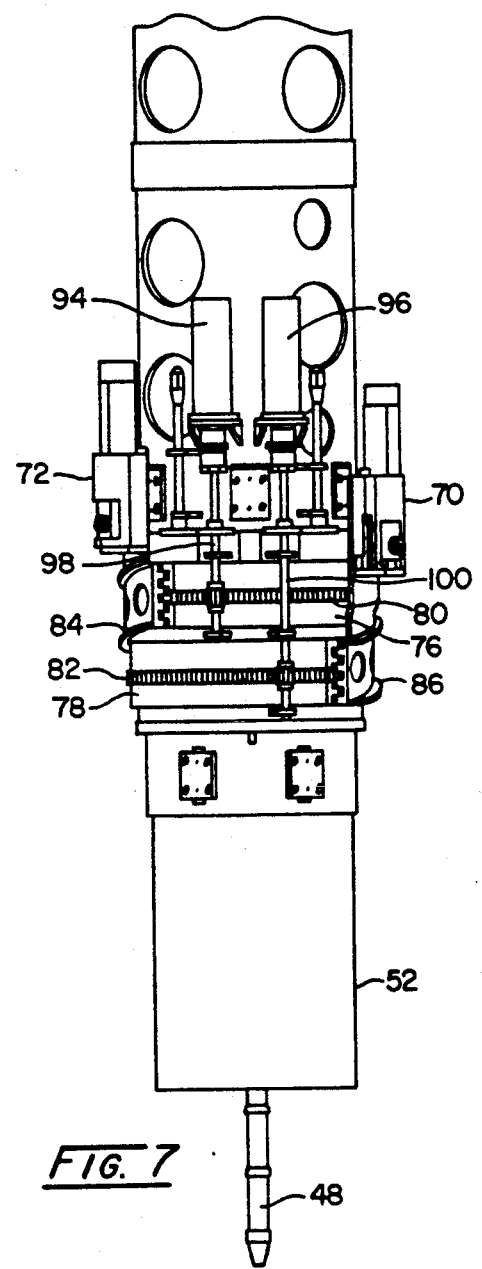
FIG. 7 is an elevational view of the drivers for the lotus drive mechanism for extending the weld head to its use position and driving the weld head in the X axis and Y axis directions.

Drive means for the lotus petal assembly can be seen by referring to FIG. 7. It will be observed that motors 94 and 96 are in geared connection with ring gears 80 and 82 via spindle assemblies 98 and 100. From the nested position shown at FIG. 8, the ring gears are driven in opposite direction for extending weld head attachment stage 88 laterally away from (X axis) said pipe segments, and thus welding head assembly 60 attached thereto, to a working position. Rotating the ring gear links in the same direction drives the stage in the circumferential direction. True rectilinear (horizontal) motion in the "Y axis" direction is achieved by differentially driving the ring gears in the same direction. Computer control of the X, Y, and Z axis drive motors (motor 94 for X axis, motor 96 for Y axis, and motor 68 for Z axis) results in driving the stage in true three-dimensional space.

Figure 14:
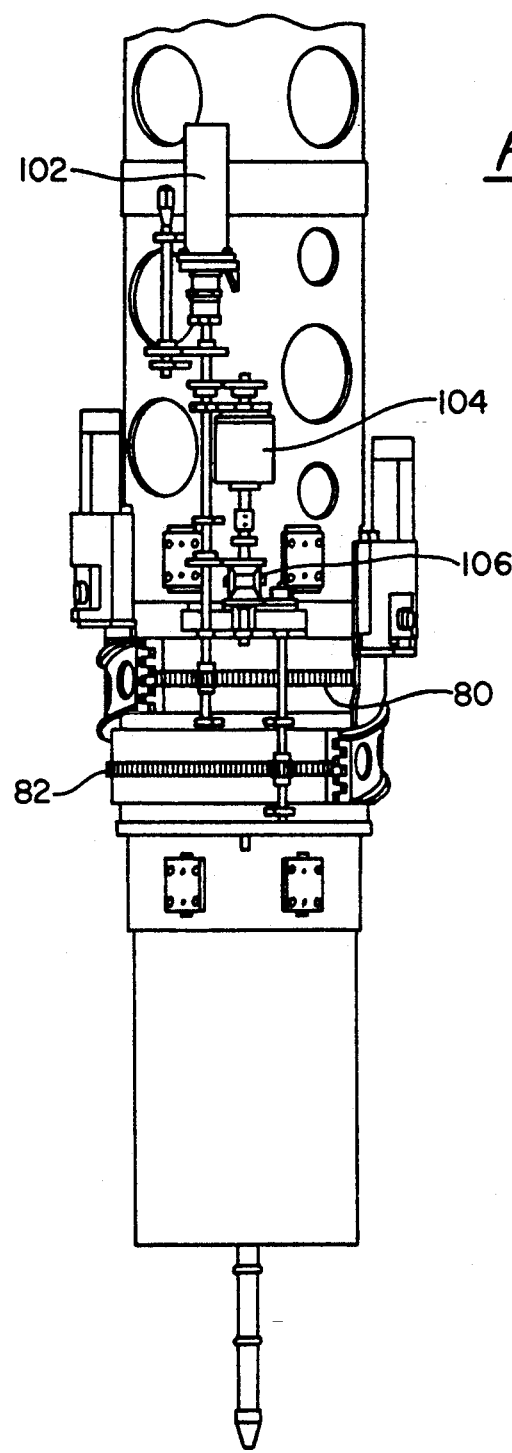
FIG. 14 is an alternate driver for the lotus drive mechanism depicted at FIG. 7.

An alterative drive mechanism for the lotus petal mechanism is shown at FIG. 14 wherein lotus drive motor 102 is in direct geared relationship with ring gear 80 and is in indirect geared relationship with ring gear 82 via clutch/brake 104. Differential gear 106 completes the alternative drive depicted at FIG. 14. Regardless of the drive employed, the lotus petal assembly exhibits a feature known as "no droop". No droop means the mechanism experiences no change in reaction force magnitudes throughout its full stroke of operation. This is an important feature for a robotic manipulator to exhibit. The practical meaning is that welding head assembly 60 remains at exactly the same elevation, e.g. Z axis position, throughout its full X and Y axis motions. The lotus petal mechanism of the present invention requires no active sensing, signal processing, or active feedback systems in order to achieve the no droop feature. Needless to say, there is very little room for such systems in the robotic welding application under consideration. The lotus petal mechanism achieves such result passively. Vertical or Z-axis loading of a lotus petal link occurs as a result of a mass being attached to weld head attachment stage 88. This weight, as force, is reacted as shears and moments on the ring gears through the hinge pins. The shear loads are constant throughout the mechanism and are reacted by the ring gears. The ring gears also react the moments at the hinge pins. These moments are constant, being the product of the applied loading on weld head attachment stage 88 and the straight line distance between the hinge pins at both ends of lotus petals 84 and 86. Because the moment on the ring gear hinges are constant, vertical deflection is constant, and, therefore, independent of linkage position. It should be recognized, however, that the moment applied to the ring gear hinges changes direction with linkage position which has no affect on Z-axis deflection, because of ring gear symmetry.

Referring to FIG. 11, attached to weld head attachment stage 88 is welding head assembly 60. Welding head assembly 60 employs welding tip 102 which preferably is a tungsten electrode as will be described in greater detail later. Weld wire fed from spool 64 and another spool not shown in the drawings is passed beneath electrode 102 by filler wire guide and nozzle assemblies 104 and 106. Each spool contains sufficient weld wire for completing one complete stub tube weldment build-up. The second spool is provided as redundancy in the event of the failure of one of the feed drive motors. Cooling water is provided by water inlet line 108 which transports water through the welding head assembly and then is removed via cooling water outlet 110. Inert gas is fed to the assembly head via a line not shown which is connected to gas line coupling 112 which is in communication with the annular space located within the welding head.

Besides welding head assembly 60 being movable in the Z (vertical) direction, and X and Y directions (with respect to pipe sections 76 and 78), roll motion is provided around roll axis 114 by roll axis drive motor 116 which operates through gear assembly 118 to drive screw 120. Pitch about pitch axis 122 is provided by pitch axis motor 124 which operates through screw 126 (see FIG. 13). All of the d.c. electric motors powering these motions are optically encoded, as are the X, Y, and Z motion motors. These signals tell the computer control system exactly where, in three-dimensional space, the welding electrode is in real time.

Welding operations in the BWR environment require one additional motion not found in common robotic devices. It is this motion which controls the distance between welding electrode 102 and the end effector. This distance is the welding arc length and is a critical parameter in the welding process. It also is constantly changing in response to the sensed voltage across the arc gap. This motion is termed "omega" and is controlled by omega drive motor 128 which drives the tungsten welding tip through pitch axis 122. Available space dictated this unique positioning of omega drive motor 128. Insufficient space was available for locating this relatively large motor on the torch side of pitch axis joint 130 (see FIG. 13). Accordingly, pitch axis bevel gear assembly 132 (FIG. 11) transmits the rotary motion from omega drive motor 128 to annular lead screw 142 in the welding head, thus creating the required linear omega motion.

Construction of the required stub tube weld build-up requires approximately 12 pounds of Ni-Cr-Fe 82 weld wire. Depositing this amount of material requires approximately 14 hours of arc time. Tungsten electrodes erode during operation and typically become unstable after approximately 4 hours of arc time. Successive starts and stops and unforeseen events, such as stub outs, decrease the theatrical service life. Tests performed indicated that one electrode could be expected to deposit only approximately 3 pounds of weld wire. Therefore, the welding robot was designed to automatically replace the electrode with on-board spares. 12 spare electrodes are contained in tungsten electrode magazine 134 and magazine 136.

The design of an automatic electrode changing mechanism is another novel and unique feature of the present invention. Tungsten electrode 102 is held tightly in the water-cooled welding head assembly with a set screw operated by pivotal lever 138 (FIGS. 11 and 13). This feature provides good electrical and thermal contact, and avoids the problem of high electrical and thermal resistance due to tungsten oxide forming on the contact area. A constant torque is applied to the set screw by a coil spring operating through lever arm 138. An air cylinder (not shown in the drawings) operating a pull cable attached to lever arm 138 releases the set screw for replacing the tungsten electrode.

Replacement electrodes, e.g. electrodes 140a–140c (FIG. 12), are delivered by gravity feed from magazines 134 and 136 above the welding head to hollow omega motion drive shaft 142 (FIG. 11). Operation of roll axis motion by roll axis drive motor 116 beyond its welding position angular limits extracts one tungsten electrode from its spring loaded magazine (e.g. magazines 134 and 136) and delivers it to loading chute 144 where it drops to the indicated position in FIG. 12. Insertion of the replacement electrode and discharge of the spent electrode requires the pitch axis motion to be driven to the vertical or zero position. This aligns hollow omega drive shaft 142 and bevel gear assembly 132 through the pitch axis motion joint 130, permitting the replacement electrode to pass freely into position in the weld head directly above the spent electrode, e.g. electrode 102. Spring loaded ball plunger (not shown) in the weld head prevents the release spent tungsten electrode from free falling out of position followed by the replacement electrode. Positive ejection of the spent electrode and simultaneous loading of the replacement electrode is achieved by tungsten loading loader/ejector motor 148 (FIG. 11) driving telescoping push rod 150. Motor 148 is located in the center of magazines 134 and 136 and is aligned with hollow omega motion drive shaft 142. Upon actuation, telescoping push rod 150 contacts the replacement electrode overcoming the friction force of the ball plunger and driving the electrode into the operating position and simultaneously ejecting the spent electrode. Upon deactuation of the air cylinder (not shown), the set screw is tightened by the coil spring attached to the tungsten release lever 138, thus establishing electrical and heat transfer continuity between the replaced tungsten electrode and the welding head.

The optical feed from camera 74 is not shown in the drawings but provides the operator remotely with real time viewing of the welding operation. Additionally, if the weldment exceeds 450° F., its integrity is compromised. Thus, an infrared sensor (not shown in the drawings) preferably is mounted on welding head assembly 60 and is directed at the weldment being created. Should the weldment temperature exceed the desired 450° F. (or other suitable limiting temperature), the welding operation can be ceased until the weldment temperature returns to a suitable level.

In order that the robotic welding system execute its intended weld build-up function, an in core housing and stub were replaced in a full size vessel mock-up. The process involved removal of an existing housing and stub tube using electrical discharge machining (EDM) techniques. The stub tube was removed flush with the pressure vessel bottom head inside surface. The surface intersected the stub tube center line at an angle of 46°, the maximum in core housing penetration angle in a BWR pressure vessel hemispherical bottom head. The stub tube was replaced by a GTAW weld build-up of Ni-Cr-Fe 82 material. Approximately 12 pounds of filler wire were used in constructing this weld build-up. A development program was undertaken for the purpose of determining the appropriate welding parameters required for this job. Also included in this program was the definition of the most effective torch path over the end effector, e.g. inclined bottom head surface, which would produce the required geometry. The results of this program indicated that the stub tube build-up was best made with successive stringer beads deposited normal to the vessel head radial line passing through the incore having bottom head penetration hole. The 2 inch diameter hole first was plugged with an expendable weld plug. Welding over this plug allowed the stub tube build-up to be deposited as a solid block. Three hundred eighty (380) dual passes were deposited to generate the required geometry which was octagonal in shape with vertical sides. The build-up was 5 inches high on the downhill side and ¼ inch high on the uphill side, and measured 4.5 inches across the flats. The as-deposited build-up was finished machined by the EDM process and drilled to accept a new incore housing.

Integrated control of the total robotic system is achieved by using an expert system computer which is programmed with the required weld build-up geometry (as determined above), as well as the welding parameters for each of the 760 weld passes (380 dual passes). The inventive robotic welding system is controlled by a three-tiered, semi-autonomous computer system. The computer used was an 80286 MS-DOS, 12 MHz IBM-compatible personal computer with an 80287 math co-processor, Galil 600 motion control motherboards (2 drive computers), and Galil Analog control boards. The hardware was mounted into a portable rack which also contained the robot's six axis motion controller, two manual override joysticks and hardware, and the modified ARC 215 welding controller pendant (Arc Welding Equipment, Pomona, Calif.). A monitor also was provided in the rack in conjunction with the optical system. The main operating system was the Galils opint 600 Motion Control System (Galil Motion Control, Sunnyvale, Calif. 94086). This shell allowed the six axis motion controller to operate independently of the memory and number sorting operations of the main system. The main computer, then, could be used strictly for system orchestration, monitoring, and higher level computation which were provided by generated geometric-based sub-programs.

These sub-programs contained the "expert" information required to perform the various welding tasks. The data was obtained by manually performing a series of weld build-ups by a number of individual human welders, as described above. This phase was required to produce an acceptable model with which to obtain all the information required to perform an actual build-up. The finished product was used to make their computer generated image.

The geometric shape of the build-up, the optimum speed required to weld each pass without altering the structure, the proper end pass temperature needed to keep the weld within required specifications, and the actual number and proper sequence of all passes needed to perform the build-up was incorporated into these programs.

The main computer was capable of controlling all external electrical operations, including warning signals, safety interlocks, and any pneumatic functions required. The main computer also managed the "well-being" of the robot by monitoring all 16 fault inputs. If any abnormality occurred during a welding operation, the robot would be instructed to stop operations and return to a predetermined safe position. In turn, If any of the three computers experienced any difficulty, the other systems would react by shutting down operations and putting the robot in as safe a location as possible.

The memories of the two motion control computers contained all the information and capabilities needed to operate the six axis drivers that were located in the motion controller housing. One control computer was for the wrist and the other for the main body of the robot. This data was "burned" into EPROM chips mounted on the boards. Interfacing to the main computer allowed these controllers to receive updated positioning information and comply in real-time. The driver modules were used to position the encoded d.c. motors on the robot. Only five axes were required for this robot: X, Y, and Z on the main body, and pitch and roll on the wrist, but the system allowed up to six. This type of architectural system allowed the simultaneous positioning of all motors. The robot was located 150 feet away from the controllers during the weld build-up operation. To overcome line loss and external interference problems, encoder amplifiers were installed at every 50 feet of cable length.

The required welding parameters that were obtained during the manual data gathering phase were contained within the Arc 215 Welding controller. This system provided the welding head of the robot with proper speed and feed of filler wire, controlled arc voltages, and proper coolant flow. This welding power supply was controlled and continuously monitored by the main robot computer for proper operation.

Also residing in the main computer's memory were programs that allowed the robot to perform other required tasks, such as, for example, tungsten welding tip change-out sequence which instructed the robot to move to a drop point where a scrap bin was located and then supply further instructions to the operator through a color computer monitor on the tip changing procedure. A "home" positioning program that put the robot in the exact location required for a returnable reference point, and then weld a spot for operator visual verification, and a "zero point calibration" routine that determined the center of the proposed build-up and calculated the angle required to weld also were resident programs in the computer's memory. The system also provided the robot with "nesting" operations that instructed the robot to fold up into the annulus when welding operations were completed.

With respect to the computer program developed to implement the foregoing control of the inventive robotic welder, reference is made to FIG. 15. Commencing the description with FIG. 15A, when the main computer (80286 personal computer) is turned on at step 200, the two Galil 600 motion control boards also are turned on at steps 202 and 204. It will be remembered that one of the boards controls the X, Y, and Z axes of the robotic welder while the second computer controls the wrist motion. Upon turning the main computer on at step 200, the main computer runs through its internal boot-up sequence at step 206. Thereafter, Basic A Software (Microsoft version) is loaded into memory at step 208. Continuing with the main computer sequence branch, the program continues to step 210 which is a batch file which loads the Arc 215 welding controller pendant at step 212. This computer program controls the welding operation itself leaving the main computer free to monitor other process conditions including gas flow, weld wire feed, arc voltage, cooling water flow, and like parameters adjunct to the welding operation itself. At step 214, the program ascertains whether the batch file from step 210 has been executed properly. If not, the program returns to step 216 for re-execution of the batch file.

At this juncture, it will be observed that upon turning the main computer on at step 200, the XYZ computer and the wrist computer each execute boot-up diagnostics at steps 218 and 220, respectively, which have been burned into their respective EPROMS. At this juncture, the program branches by having the batch file in step 210 also control the loading of data to the XYZ computer and wrist computer as described with more particularity below. With respect to the XYZ computer, the program then proceeds to step 220 wherein inputs from motion controller #1 are received. Such inputs include the XYZ welder circuits at step 222 and the motion controller with three-axes (X, Y, and Z) at step 224 being fed as input to the XYZ computer. At step 226, the program ascertains whether the input was received properly. If not, the program returns to step 228 for re-execution of the appropriate batch file at step 210 controlling the input at step 221.

With reference to the wrist computer, the program commences to step 230 wherein input from the wrist welder circuits at step 232 and motion controller with two axis degrees of freedom at step 234 are inputted to step 230. Again, at decision step 236, the program ascertains whether the input, basically in the encoder loops, has been properly received. If not, the program returns to step 238 for re-execution of the appropriate batch file at step 210 for the input at step 230. If the decision steps 214, 226, and 236 indicate that all inputs have been properly received, the program proceeds to step 240 at FIG. 15B.

The program at step 240 loads the Number List (NUM.LST) into memory. The Number List is stored also in Basic language and comprises the appropriate welding paths required depending upon the geometry at the RPV bottom head. It will be remembered that for the maximum 46° angle, 380 double passes are required. Each one of the passes has been sequentially numbered and is stored in the Number List at step 240 of the program. Next, the program continues to step 242 wherein the Galil DMC 600 software is loaded in the memory. This resident software is used to run the motion controllers. It has the ability to simultaneously run six axes machine control and handle addressing and memory storage. Further, it interfaces with the other Galil motion control equipment installed in the system. For example, the system employs manual override capability via XYZ joysticks which control the wrist motion of the welding head. This is represented at step 242 of the program which inputs into analog controller 244 which downloads into the DMC-600 software at step 240 letting the system know that the joysticks are on-line and capable of being utilized.

Next, the program continues to step 243 wherein Galil SDK-600 software is loaded into memory. This piece of software permits on-screen diagnostics to be run including monitoring the appropriate ramp rates, and permits an oscilloscope of all of the motors to be displayed on the screen. This is convenient for the operator that is some 150 feet away from the robotic welder itself to have the capability of an oscilloscope being attached to all of the motors. Next, the program continues to step 245 wherein all of the input ports are checked, for example, are all of the joysticks hooked up, are all of the motors hooked up, etc. At decision step 246, if the input ports do not check out, the program proceeds to error fault program step 248 which essentially is a red screen that flashes on the CRT letting the operator know the error condition that has been detected. At this point, the program continues to node step 250 wherein the program returns to step 243. If, however, all of the input ports check out appropriately, the program proceeds to step 251 which is a "welcome" screen to the operator announcing that the robotic welding system is ready for operation.

At this point, the program enters tutorial step 252. Thereafter, a decision is to be made by the operator at step 254 as to whether the operator wishes to enter the welding mode of the program. If not, the program continues to stand-by program step 256 which returns the program to step 258 which is the program tutorial option. If the operator does wish to enter into the welding mode, the program continues to step 260 at FIG. 15C.

Step 260 essentially is the main window screen which displays the main control panel at step 262 which essentially is three buttons on the screen (accessed by keyboard arrow keys) indicating that the operator can proceed with one of three options in the program.

Initially focusing on the calibration branch of the program which requires the operator to hit button number 1 at step 264, the program then enters into welder calibration routine at step 266. The program at step 268 then looks to see whether the joystick and analog controller are hooked up and operating properly. At decision step 270, if such inputs are ascertained to not be proper, the program proceeds to error program step 272 wherein the operator is notified of the error condition. The program then returns to step 264.

If decision step 270 indicates that all of the hardware is appropriately configured and operating, the program continues to step 273 wherein manual control of the robot by the operator is exercised. At this point, the program proceeds to step 274 where the operator is permitted to remove the welding head from the nest position to a stub tube hole at its center at step 276. At step 278, the location of the center hole indicated by the operator's positioning of the welding tip at the hole center is located and inputted as a zero calibration location. At this point, the computer takes over the joystick operation and raises the welding tip about four inches above the hole center and moves out a predetermined number of steps, depending upon the hole size, and thence down again to a "home" location about one-half inch above the surface to be welded. The operator then takes over and moves the welding tip the extra one-half inch down to the surface at step 280 which position then is recorded in memory. Based on the zero calibration and home locations, the program calculates the angle of the surface to be welded and inputs such angle to the build-up angle data step 304 of the program. Depending on the angle, the appropriate welding pass data from the Number List at step 240 of the program can be utilized in welding with the robotic welder of the present invention.

The program simultaneously then proceeds to step 282 to make sure that the welder is properly hooked up. At step 284, the operator has the decision to determine whether the welder is at a proper position and operating properly. If the condition is indicated to be incorrect, the program proceeds to node step 286 for repeating step 280 of the program. If the welder is in the proper position, then the robot takes over and proceeds to generate a three second spot weld at the home point at step 288. By creating this weld spot, the operator always can return the welding head to this position to re-input the home point should a loss of memory be suffered by the program. Following the three second spot weld, the welding head immediately proceeds to a predetermined safe point at step 300 and thence to step 302 where the welder calibration routine is determined to be done. The program then returns to main window step 260 wherein the main control panel at step 262 again is displayed.

Commencing to describe the teaching branch of the computer program, the program proceeds to touch welder geometry step 306 wherein the operator will touch the intersecting points of the geometry of the weld to be created, which in this case is on an octagonal weld, requiring the touching of each of the eight points creating the octagon. In this way, the program will be taught the appropriate geometry should different size holes be required to be welded. At this point, the program at step 308 ascertains whether the joystick analog controller and joysticks are operating properly, and at step 310 whether the welding robot is operating properly. If the answer is no for either of these steps, then the program returns to node 312 for repeating the touch welder geometry step of the program. If, however, all functions are operating nominally, the program continues to step 314 wherein the operator manually controls the robot for touching the appropriate points of the weld configuration which are recorded at step 316 of the program. After each point is inputted at step 316, the program at step 318 asks whether the last point has been touched. If the answer is in the negative, then the program returns to node 312 for the teaching routine to be repeated for additional points to be touched and their position recorded. When the last point has been touched, the program proceeds to step 320 wherein the robot is ordered to return to the safe position and at step 322 the teaching routine has been determined to be completed so that the program can return to the main window at step 260 of the program.

Figure 15A:
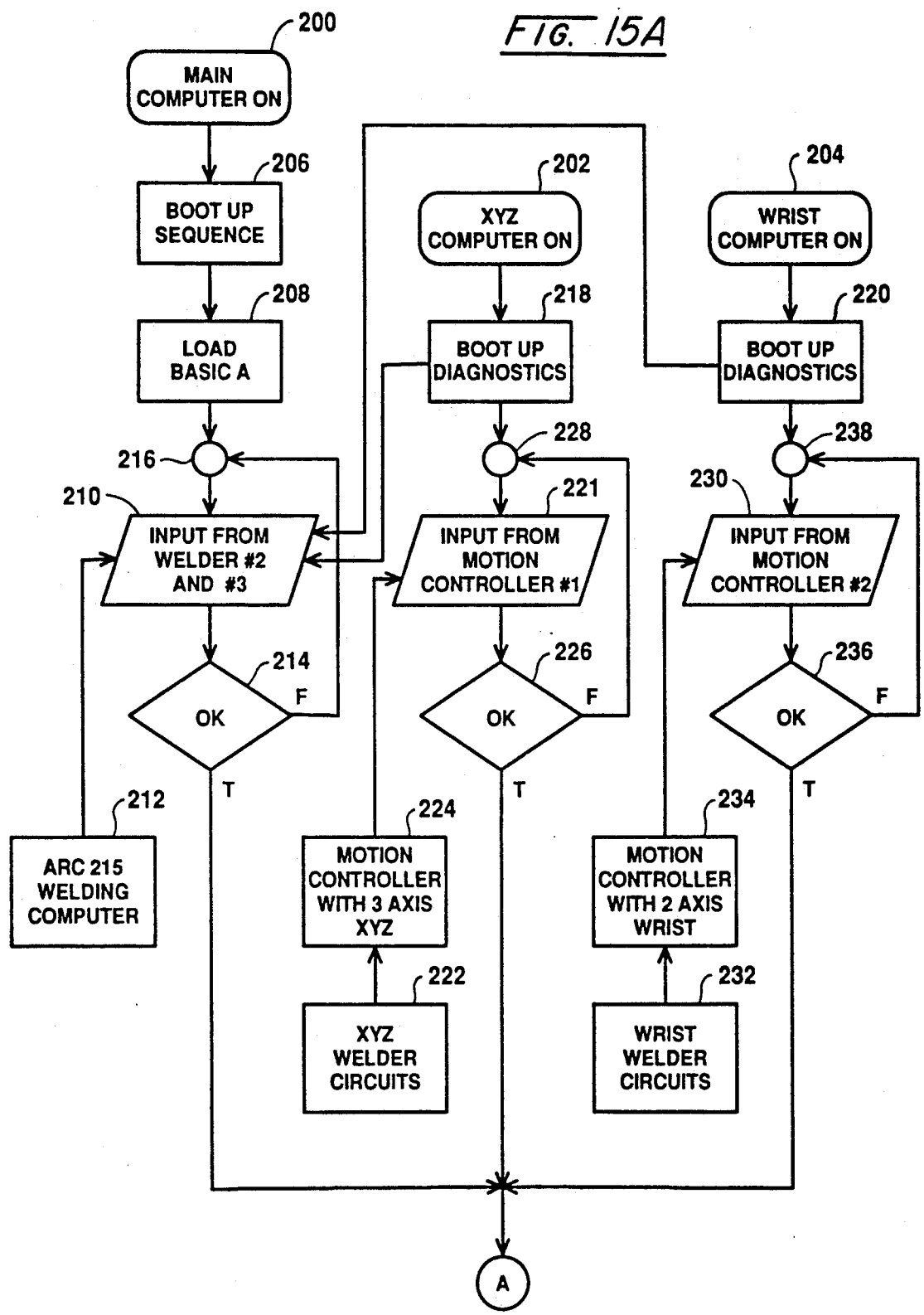
Figure 15B:
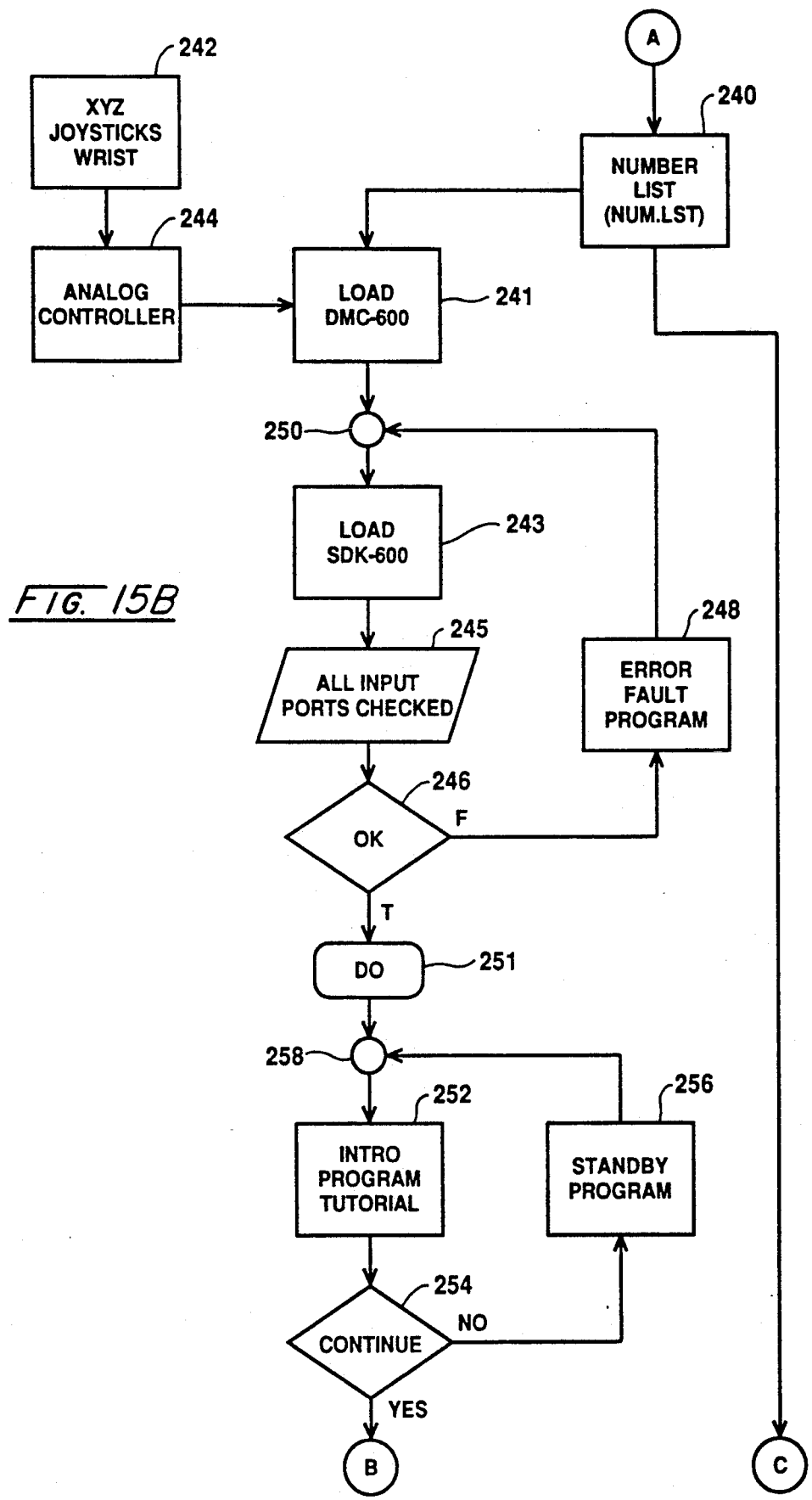
Figure 15D:
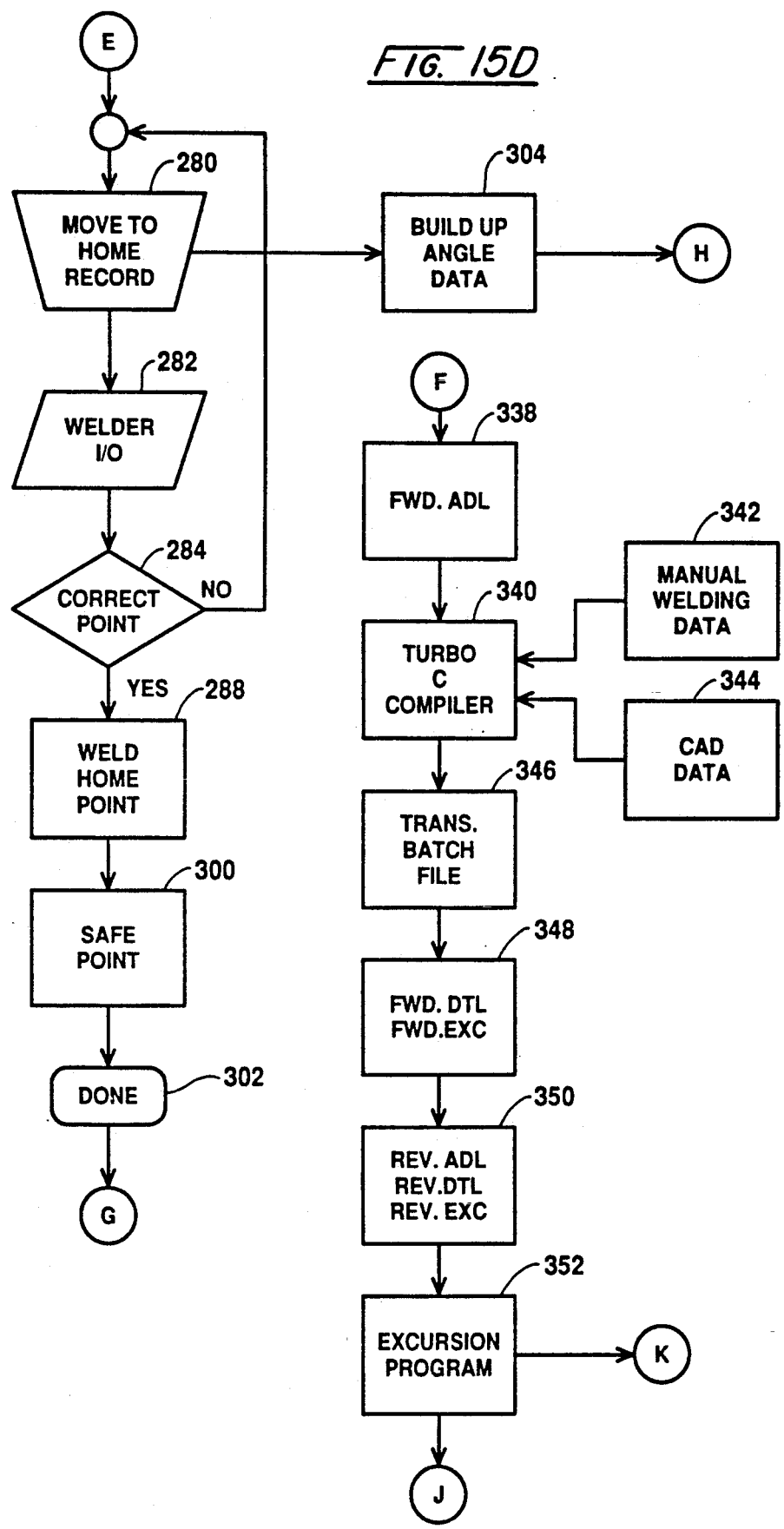
Figure 15E:
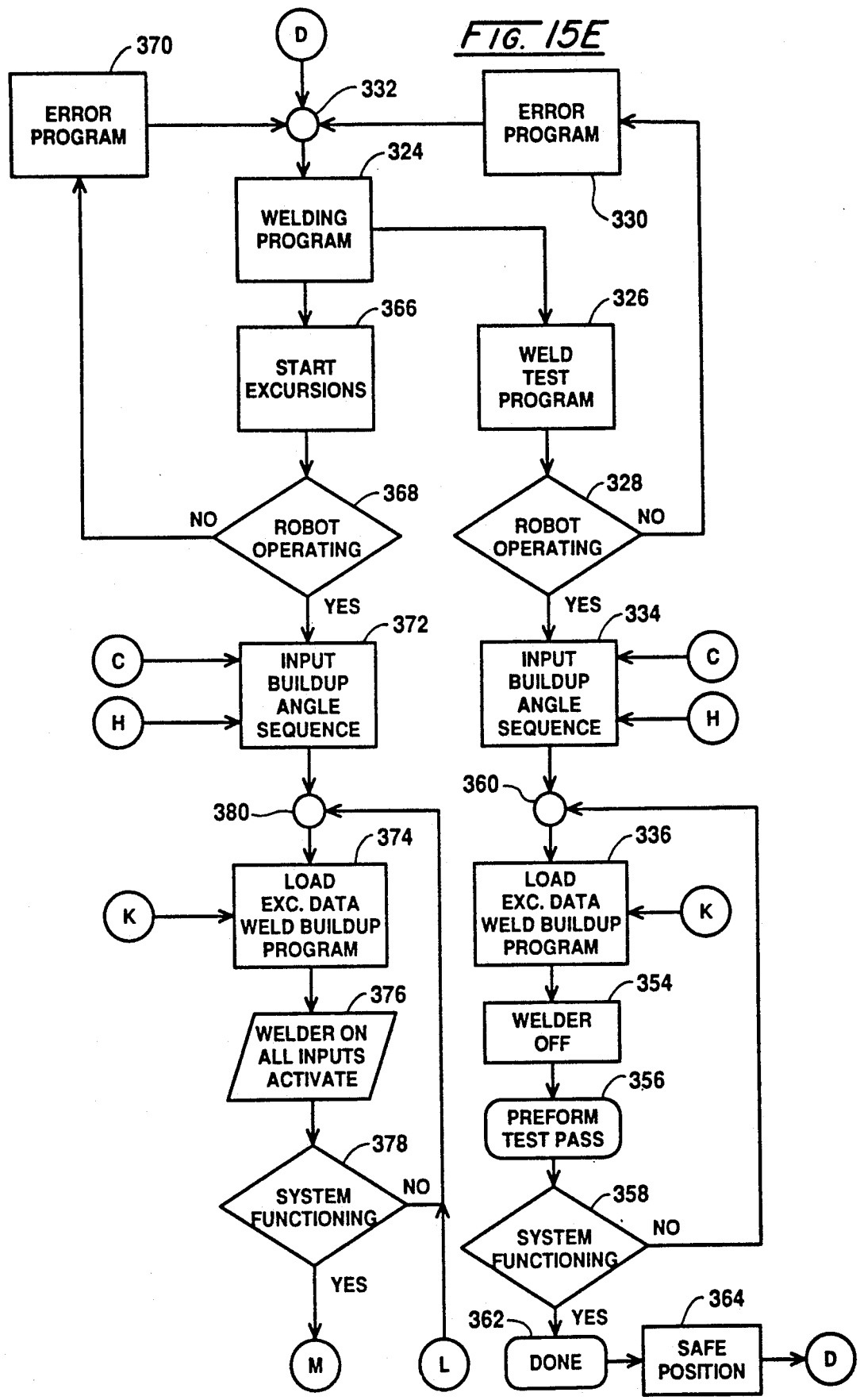
Figure 15F:
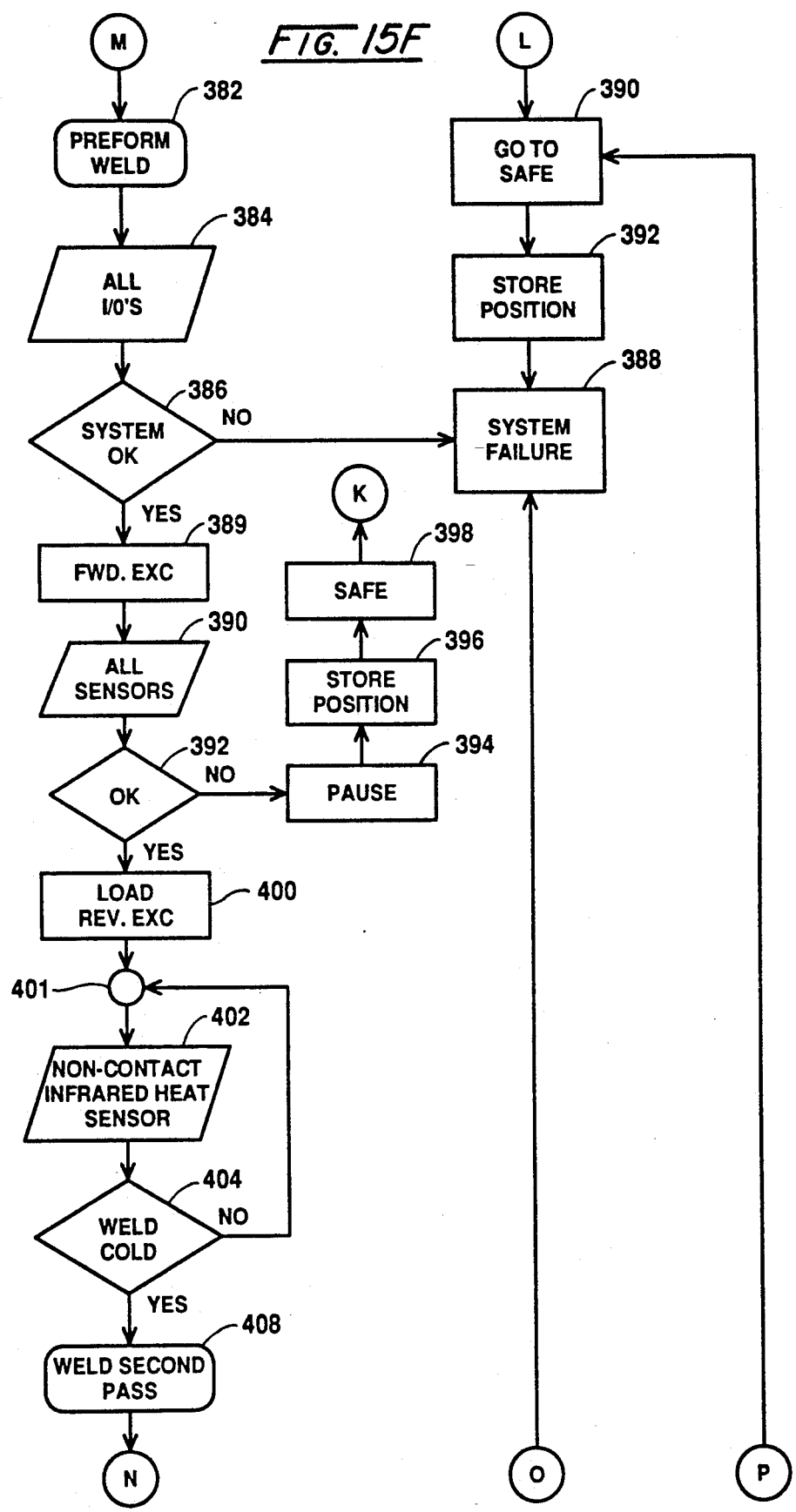

The third option on the main control panel at step 262 is to proceed to actually weld with the inventive robotic weld of the present invention, as described commencing with FIG. 15E. The program commences to step 324 which is a screen that permits the operator to select actual welding or a practice welding routine. When the operator selects the practice routine, the program proceeds to step 326 which commences the weld test program. At this point, the program proceeds to step 328 to ascertain whether the welding robot is operating properly. This means checking the encoders and all inputs/outputs. If the decision is negative, then the welding head automatically is positioned in the safe position and the program proceeds to step 330 wherein a screen alerts the operator to the faulty condition. The program then returns to node 332 so that the welding program at step 324 can be displayed to the operator again. When all robot operating conditions are determined to be operating properly, the program proceeds to step 334 wherein the input build-up angle sequence routine is executed. Inputted into this sequence is the Number List from step 240 as well as the build-up angle data from step 304 of the program. The program then proceeds to step 336 wherein the excursion data is loaded into memory. This data is inputted from a routine described at FIG. 15D. It will be observed that the analog data list at step 338 is inputted into turbo C compiler at step 340 which is an off-line computer that provides calculation that can be inputted to the DMC 600 software. Manual welding data from step 342 and CAD generated data from step 344 (both described previously) are inputted also into the turbo C compiler at step 340. Next, the program proceeds to step 346 wherein the trans.batch file is executed. Essentially, this file requires the forward digital and forward excursion data in two different languages to be calculated and inputted into memory. At step 350, the program compiles the reverse information of the digital and excursion forward data. The program then proceeds to excursion program step 352 which inputs this data to step 336 and another step to be described later.

Returning to FIG. 15E and the weld test program routine, the program then at step 354 determines that the welder is off which then permits step 356 wherein the test pass (two excursions) is conducted. At decision step 358, the operator is permitted to determine whether the test pass was performed properly. If not, the program returns to node 360 wherein step 336 et sequence is repeated. If the system is operating properly and the pre-form test pass was proper, the program proceeds to step 362 indicating that the practice test weld has been completed which permits the welding head to be returned to the safe position at step 364 and the program returns to node 332 which brings up the welding program screen at step 324.

When actual welding is to be performed, the program proceeds to step 366 wherein the welding excursion program commences. The program at step 368 then checks to see whether the robot is operating properly, including encoders, I/O, voltage, etc. If the robot is not operating properly, then the program proceeds to step 370 wherein the error program alerts the operator to the faulty condition and the program returns to node 332 and welding program step 324 of the program. If the robot is operating properly, then the program proceeds to step 372 which is the input build-up angle sequence step of the program. This step is identical to step 334 and the inputs as described previously.

Thereafter, the program proceeds to step 374 wherein the excursion data weld build-up program is loaded. This step is the same as step 336, described above as well as are its inputs. Next, the program proceeds to step 376 wherein the determination is made as to whether the welder is on and all inputs are activated. The program then ascertains at decision step 378 whether the system is functioning properly. If not, the program proceeds to node 380 wherein an error message is displayed to the operator and the program returns to step 374. If at decision step 378, it is determined that the system is functioning nominally, the program proceeds to step 382 wherein the welding is performed (see FIG. 15F). During the welding, all I/Os are monitored at step 384 ever 1/127th of a second in order to see that they are operating properly. At step 386, the program determines whether the system is functioning properly. If not, then the program proceeds to system failure program at step 388 of the program. At this point, at step 390, the position of the welding head is recorded and then the welding head is returned to a safe position which is about ½ in. above and 6 in. over from the point at which the error occurred. When the system returns to a "go" or weld position, the program returns the welding head to the prior position back one-half inch and commences the welding operation with no wire being fed for about five seconds. Wire then is fed and the welding proceeds. This bleed-in routine means that the operator does not have to worry about where the welding stopped and where it should be recommenced. The ½ in. or so bad area is ground off and the weld is continued in uninterrupted fashion.

If the system is determined to be okay at decision step 386, the program proceeds to step 389 where the forward excursion is executed. At step 390, the sensors are polled to make sure that the system is functioning properly. At step 392 the decision as to whether the system is functioning properly is made. If it is not, the system pauses at step 394 and the robot stores the position of the welding head at step 396 (as described above) and the welding head then returns to a safe position at step 398. The program then returns to step 374.

At step 392 if everything is operating properly, the program pauses for the reverse excursion to be loaded into memory and then the reverse excursion is executed at step 400. The program then proceeds to step 402 where the non-contact infrared heat sensor scans the just completed weld to determine whether the temperature is within operating specifications, e.g. less than 450° F. as described above. If the weld temperature exceeds this or another set point temperature as determined at step 404, the program proceeds to step 406 where the program again proceeds to step 402 for determining the weld temperature. This loop is repeated until the weld is determined to be within the temperature specification set, whereupon the program proceeds to step 408 and a second weld pass is executed.

Figure 15G:
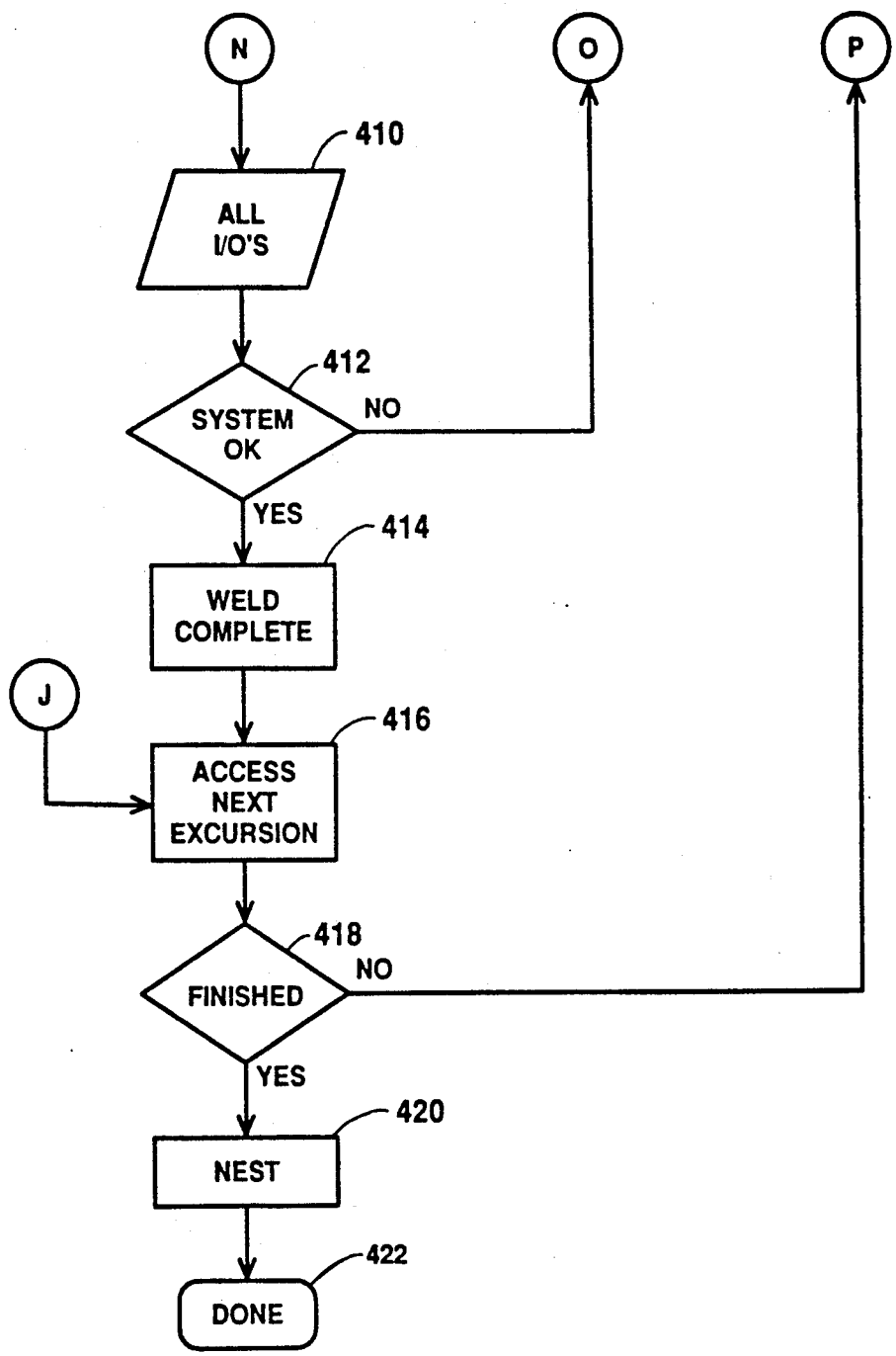

Turning to FIG. 15G, the program proceeds to step 410 where all I/Os again are polled. At decision step 412, if the I/Os are determined not to be functioning properly, the program returns to system failure program step 388, described above. If the system is operating properly, the program proceeds to step 414 wherein it is determined whether the weld is complete. If the weld is complete, then the program proceeds to step 416 where the next excursion is accessed. An input to step 416 is the excursion program from step 352. At decision step 418, the program ascertains whether the welding operation is complete. If it is not, the program returns to step 390.

When the welding operation is determined to be complete at step 418, the program proceeds to step 420 wherein the welding head is returned to its nested position and the program proceeds to step 422 wherein the operator is alerted that the welding operation is done.

Since certain changes may be made in the above-described invention without departing from the scope of the invention herein involved, it is intended that all matter contained in the description thereof or shown in the accompanying drawings shall be interpreted as illustrative and not in a limiting sense.

I claim:

1. An apparatus for storing an end effector nestably adjacent a pipe to which it is attached and for moving said end effector into a working position laterally-displaced (X axis) from said pipe, which comprises:
   (a) a pair of pipe segments in rotating end-abuttable relationship, each segment bearing a ring gear about its circumference;
   (b) a pair of helical lotus petals having an inner surface which conforms to the outer surface of a pipe segment to which each lotus petal is hingedly attached at a distal end, each lotus petal being attached hingedly at their respective proximal ends to a lotus petal hinge attachment stage and carrying engaged gear segments on each lotus petal proximal end which stabilize the lotus petals with respect to each other;

(c) drive means drivedly connected to each of said ring gears for separately driving each pipe segment; and (d) an end effector carried by said lotus petal hinge attachment stage, each lotus petal and said lotus petal hinge attachment stage, and thus said end effector, being nestably stored adjacent their respective pipe segments, said end effector being moveable to a working position laterally-displaced (X axis) from said pipe by said drive means rotating said pipe segments in opposite directions and being moveable horizontally (Y axis) by said drive means differentially rotating said pipe segments in the same direction.

2. The apparatus of claim 1 wherein said ring gears have bosses which carry hinges to which each lotus petal is attached at their distal ends.

3. The apparatus of claim 1 wherein said end effector comprises a robotic welding assembly.

4. The apparatus of claim 1 wherein said drive means comprises two d.c. motors, one each of which drives each pipe segment.

5. The apparatus of claim 1 wherein said drive means comprises a d.c. motor coupled with said pipe segments through a clutch/brake and a differential gear.

6. A method for storing an end effector nestably adjacent a pipe to which it is attached and for moving said end effectuator into a working position laterally-displaced (X axis) from said pipe, which comprises:
(a) providing an apparatus comprising:
(1) a pair of pipe segments in rotating end-abuttable relationship, each segment bearing a ring gear about its circumference;
(2) a pair of helical lotus petals having an inner surface which conforms to the outer surface of a pipe segment to which each lotus petal is hingedly attached at a distal end, each lotus petal being attached hingedly at their respective proximal ends to a lotus petal hinge attachment stage;
(3) drive means drivedly connected to each of said ring gears for separately driving each pipe segment; and
(4) an end effector carried by said lotus petal hinge attachment stage;
(b) moving said end effector laterally-displaced from said pipe by rotating with said drive means said pipe segments in opposite directions; and
(c) moving said end effector horizontally (Y axis) by differentially rotating with said drive means said pipe segments in the same direction.

7. The method of claim 6 wherein said ring gears are provided as having bosses which carry hinges to which each lotus petal is attached at their distal ends.

8. The method of claim 6 wherein said end effector provided comprises a robotic welding assembly.

9. The method of claim 6 wherein said drive means provided comprises two d.c. motors, one each of which drives each pipe segment.

10. The method of claim 6 wherein said drive means provided comprises a d.c. motor coupled with said pipe segments through a clutch/brake and a differential gear.

11. A welding tip loading apparatus for ejecting a spent welding tip and loading a new welding tip for use by a robotic welding apparatus, which comprises:
(a) a magazine which retains a plurality of welding tips;
(b) a hollow loading chute disposed beneath said magazine and adapted to receive a welding tip from said magazine;
(c) a remotely-actuable driver for urging a welding tip from within said magazine into said loading chute;
(d) a hollow loading chamber which retains an annular reciprocating telescoping loader/ejector, said chamber in communication with said loading chute for receiving a welding tip disposed in said chute, said loader/ejector adapted to move the welding tip through said loading chamber into a position where a portion of said welding tip protrudes out of said loading chamber and in a welding use position;
(e) biasing means for retaining said welding tip in its welding use position; and
(f) a movable remotely-actuable connector which communicates to within said loading chamber, said connector in communication with a source of electrical power and being moveable from a position where it contacts said welding tip for providing electrical connection to the welding tip in its use position to a position where it no longer contacts said welding tip so that the welding tip can be released from said loading chamber by said loader/ejector to be replaced by another welding tip which is fed by the loader/ejector to a use position.

12. The apparatus of claim 11 wherein said robotic welding apparatus comprises a welding head having an articulated welding tip wrist attached to an arm which bears said magazine, said arm connected to an arm driver for effecting integral roll motion of said arm and wrist, said wrist connected to a wrist driver for effecting pitch motion of said wrist relative to said arm, said arm bearing said hollow loading chute and said loader/ejector, said wrist bearing said hollow loading chamber and said welding tip; whereby operation of said arm driver to effect integral roll motion to a predetermined position permits said welding tip housed within said magazine, which is spring loaded, into said loading chute; operation of said wrist driver to vertically align said loading chute with said hollow loading chamber permits said welding tip in said loading chute to pass into said loading chamber; and actuation of said loader/ejector pushes said welding tip in said loading chamber into a spent welding tip for ejection of said spent welding tip and replacement by said welding tip in said loading chamber.

13. The apparatus of claim 12 wherein said drivers comprise d.c. electric motors and said connector is pneumatically moveable.

14. A method for ejecting a spent welding tip and loading a new welding tip in a robotic welding apparatus, which comprises:
(a) providing a welding tip loading apparatus which comprises:
(1) a magazine which retains a plurality of welding tips;
(2) a hollow loading chute disposed beneath said magazine and adapted to receive a welding tip from said magazine;
(3) a remotely-actuable driver for urging a welding tip from within said magazine into said loading chute;
(4) a hollow loading chamber which retains an annular reciprocating telescoping loader/ejector, said chamber in communication with said loading chute for receiving a welding tip disposed in said chute, said loader/ejector adapted to move the welding tip through said loading chamber into a position where a portion of said welding tip protrudes out of said loading chamber and in a welding use position;

(5) biasing means for retaining said welding tip in its welding use position; and (6) a movable remotely-actuable connector which communicates to within said loading chamber, said connector in communication with a source of electrical power and being moveable from a position where is contacts said welding tip for providing electrical connection to the welding tip in its use position to a position where it no longer contacts said welding tip so that the welding tip can be released from said loading chamber by said loader/ejector to be replaced by another welding tip which is fed by the loader/ejector to a use position;

(7) said robotic welding apparatus comprises a welding head having an articulated welding tip wrist attached to an arm which bears said magazine, said arm connected to an arm driver for effecting integral roll motion of said arm and wrist, said wrist connected to a wrist driver for effecting pitch motion of said wrist relative to said arm, said arm bearing said hollow loading chute and said loader/ejector, said wrist bearing said hollow loading chamber and said welding tip;

(b) activating said arm driver to effect integral roll motion of said arm and wrist to a predetermined position for permitting said welding tip housed within said magazine, which is spring loaded, to pass into said loading chute;

(c) activating said wrist driver to vertically align said loading chute with said hollow loading chamber for permitting said welding tip in said loading chute to pass into said loading chamber;

(d) moving said connector to a position where it no longer contacts said spent welding tip in its use position;

(e) activating said loader/ejector for pushing said welding tip in said loading chamber into a spent electrode for ejection of said spent welding tip and replacement by said welding tip in said loading chute; and (f) moving said connector to a position where it contacts said replacement welding electrode.

15. A robotic welding apparatus adapted to be placed at the bottom head of a nuclear reactor pressure vessel (RPV) for effecting weld build-ups and repairs, which comprises:

(a) an upper guide can stationarily-attached to a first tube of a pair of annular telescoping lower tubes;

(b) an annular moveable water seal can which houses said pair of telescoping lower tubes, and is moveable from a position where, when filled with gas, it encases said telescoping lower tubes and keeps water out so that said apparatus can be lowered in a water-filled RPV to its bottom head, to a position where it is retracted upwardly to expose said telescoping lower tubes when the RPV is drained of water;

(c) a water seal can driver for moving said water seal can;

(d) an elongate clamp tool which firmly retains the second of said pair of lower tubes against the RPV bottom head;

(e) a driver for extending the first telescoping tube away from the second telescoping tube; and (f) a robotic welding assembly attached to said first telescoping tube in a nested position against said first telescoping tube when said water seal can encases said telescoping lower tubes and moveable laterally away from said first telescoping tube when said water seal can is in its retracted position.

16. The apparatus of claim 15 wherein said welding assembly includes the apparatus of claim 1.

17. The apparatus of claim 16 wherein said end effector includes the apparatus of claim 11.

18. The apparatus of claim 16 wherein said end effector includes the apparatus of claim 12.

19. A method for effecting weld build-ups and repairs at the bottom head of a nuclear reactor pressure vessel (RPV) which includes upper and lower apertured core plates and a plurality of control rod stube tube and housing assemblies, which comprises:

(a) lowering a robotic welding apparatus down into said RPV containing water through said upper and lower apertured core plates, said welding apparatus comprising:

(1) an upper guide can stationarily-attached to a first tube of a pair of annular telescoping lower tubes;

(2) a gas-filled, moveable annular moveable water seal can which encases said pair of telescoping lower tubes to keep water out while said apparatus is lowered into said water-filled RPV to its bottom head;

(3) a water seal can driver for moving said water seal can;

(4) an elongate clamp tool which is capable of firmly retaining the second of said pair of lower tubes against the RPV bottom head;

(5) a driver for extending the first telescoping tube away from the second telescoping tube; and (6) a robotic welding assembly attached to said first telescoping tube in a nested position against said first telescoping tube when said water seal can encases said telescoping lower tubes and moveable laterally away from said first telescoping tube when said water seal can is in its retracted position;

(b) resting said second lower tube on the end of a stube tube with said housing penetrating withing the annulus of said second lower tube;

(c) engaging said clamp tool to firmly retain said second lower tube against the end of said stub tube;

(d) draining water out of said RPV;

(e) retracting said water seal can upwardly to expose said telescoping tubes and said welding head; and (f) engaging said welding head to effect weld build-ups or repairs.

20. The method of claim 19 wherein said welding head is moved to a working position according to the method of claim 7.

* * * * *